Aug. 29, 1933.  M. HOUDAILLE  1,924,404
SHOCK ABSORBER ADJUSTING DEVICE
Filed March 28, 1931   2 Sheets-Sheet 2
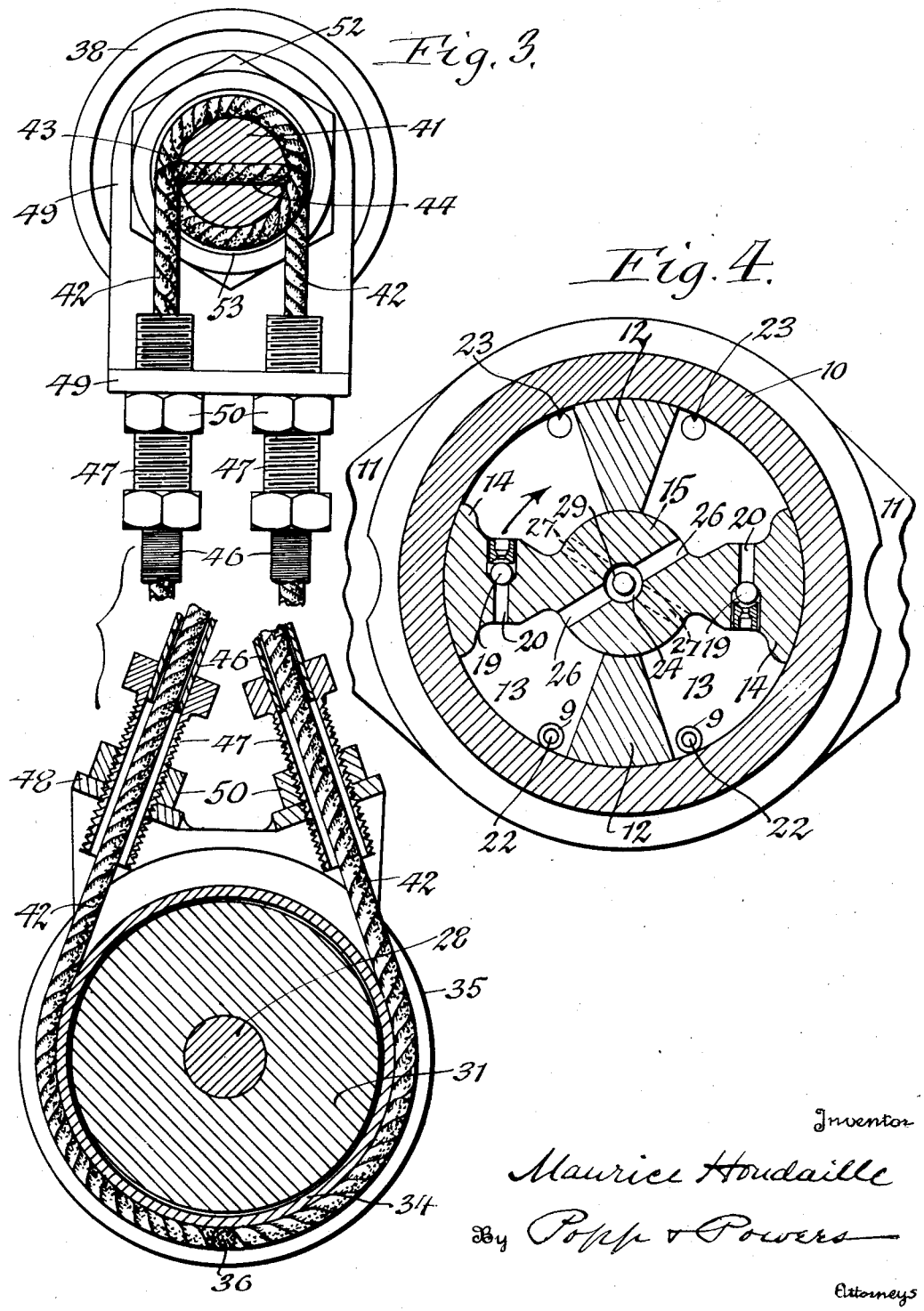
Inventor
Maurice Houdaille
By Popp & Powers
Attorneys Patented Aug. 29, 1933

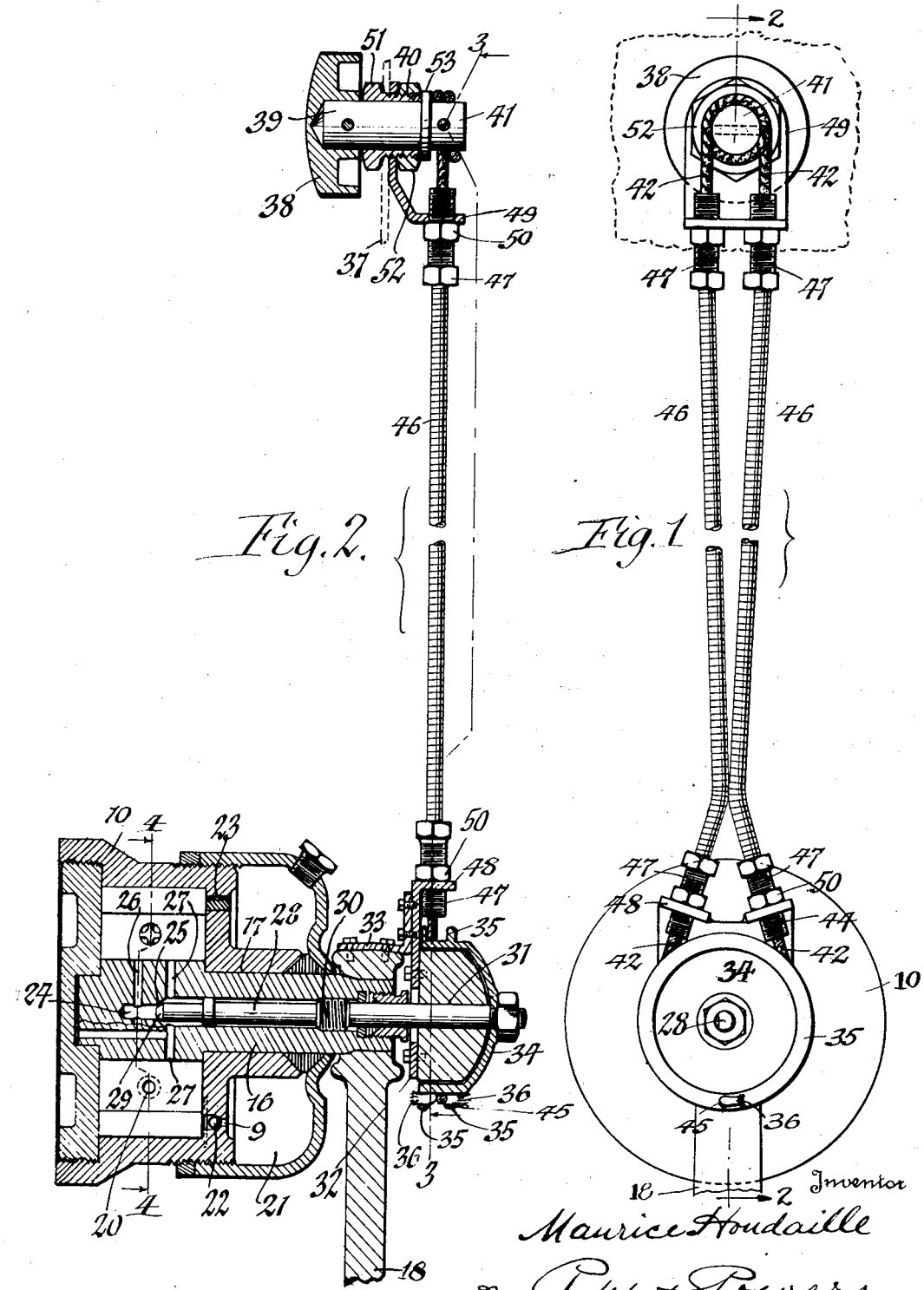

1,924,404

UNITED STATES PATENT OFFICE 1,924,404

SHOCK ABSORBER ADJUSTING DEVICE

Maurice Houdaille, Levallois-Perret, France, assignor to Houde Engineering Corporation, Buffalo, N. Y., a corporation of New York Application March 28, 1931, Serial No. 526,070, and in France April 17, 1930

2 Claims. (Cl. 74—39)

This invention relates to a device for adjusting the effect of a shock absorber on an automobile or the like by means which are operable at a point remote from the absorber, and more particularly to a device of this character whereby the effect of hydraulic shock absorbers may be adjusted from a distance.

Such shock absorbers are usually arranged on different parts of an automobile between members thereof which are relatively movable as the automobile passes over an uneven part of the roadway.

Heretofore such shock absorbers have been adjusted by means which are mounted directly on the absorber and this is objectionable because the car must be stopped in order to effect such adjustment and then tried out to see if the results are satisfactory, which method is not only inconvenient but also involves considerable expenditure of time before the absorber is properly adjusted to cushion the load which is imposed upon the same.

A further objection to these former constructions is that the adjustment of the shock absorber cannot be effected while the car is in operation, thereby preventing the nicety of regulation under working conditions which is desirable.

It is the object of this invention to provide simple, efficient and reliable means whereby absorbers of this character may be adjusted at a point remote from the instrument and while the automobile is in operation so as to adapt the shock absorbing capacity of the instrument at will in accordance with the load imposed upon the same and other conditions.

In the accompanying drawings:

Figure 1 is a rear elevation of a hydraulic shock absorbing device and a valve adjusting attachment therefor embodying my invention.

Figure 2 is a vertical longitudinal section taken on line 2—2 Fig. 1.

Figure 3 is an enlarged vertical transverse section of the attachment, taken on line 3—3 Fig. 2.

Figure 4 is an enlarged vertical transverse section taken on line 4—4 Fig. 2.

In the following description similar characters of reference indicate like parts in the several figures of the drawings.

Although this invention is applicable to shock absorbers of various types and constructions the same is shown in the present case in connection with a hydraulic shock absorber of the Houdaille type which in its general organization is constructed as follows:

The numeral 10 represents the body of the absorber which may be connected with the chassis of an automobile in any suitable manner, for instance—by means of lugs 11 arranged on opposite sides of the body and secured to the chassis or frame by means of bolts or other means. Within this body is formed a cylindrical space which is divided by diametrically opposite partition sections 12 into two working chambers 13 which are adapted to contain a resistance liquid. In these working chambers two diametrically opposite pistons 14 oscillate, which pistons are connected to opposite sides of a hub 15, which latter is connected with the rear end of a shaft 16 journaled in a bearing 17 projecting forwardly from the front side of the body. The outer or front end of this shaft has secured thereto an operating rock arm 18 which latter is connected by any suitable means with a part of the automobile which moves relatively to the chassis or frame such for instance as the axle which carries the wheels of the automobile and is resiliently connected with the frame by means of a spring system.

During the forward movement of the pistons in the working chambers, as indicated by the direction of the arrow in Fig. 4, the liquid in front of each of these pistons is prevented from passing through the respective piston to the rear side thereby by a check valve 19 which closes a port 20 in this piston but during the return or backward stroke of each piston the check valve 19 moves away from its seat and permits the liquid to move with comparative freedom from the high pressure end of the respective working chamber to the low pressure end of the same. It follows from this that a comparatively light shock absorbing effect is produced on the relatively movable axle and frame of the automobile while these members are moving away from each other, but a heavier shock absorbing effect is produced while the axle and frame of the automobile are moving toward each other during rebound.

Liquid is supplied to the working chamber as required from a replenishing chamber 21 arranged in front of the body of the absorber, which replenishing chamber communicates at its lower end with the lower parts of the working chambers by means of check valves 22 which are arranged in ports 9 on the adjacent part of the absorber body, each of these check valves opening toward the respective working chamber, but closing toward the replenishing chamber. Any air which is trapped in the upper part of the working chambers is permitted to escape into the upper part of the replenishing chamber through vents 23 formed in the upper part of the absorber body and connecting the upper parts of the working chambers and the replenishing chamber.

For the purpose of regulating the shock absorbing effect of the absorber to suit different loads which may be imposed upon the same and other conditions, means are provided for permitting some of the liquid to pass back and forth from one end of each working chamber to the opposite end thereof, or in other words to pass from one side of the piston to the opposite side thereof, the amount of liquid which is thus permitted to pass back and forth being regulatable according to the shock absorbing capacity which is required or desired.

The particular means which are shown in the drawings for accomplishing this purpose are constructed as follows:

The numeral 24 represents a valve chamber extending lengthwise through the center of the shaft 16 and the hub 15 from the front end of this shaft and provided at its inner end with a valve seat 25 and connected in rear and front of said valve seat by passages 26, 27 leading to opposite ends of the working chambers, and on opposite sides of the pistons therein.

Within the valve chamber is arranged a longitudinally movable valve stem 28 which is provided at its rear end with a valve 29 adapted to move toward and from the valve seat 25 for regulating the amount of resistance liquid which can flow through the valve chamber and the ports or passages 26 and 27 from one side of the pistons to the other, and thereby governing the shock absorbing capacity of the instrument accordingly.

This longitudinal movement of the valve stem 28 is preferably effected by means of a screw joint 30 between the valve stem and the shaft 16 so that upon turning this stem in one direction or the other the valve 29 at its rear end will be moved toward and from the valve seat 25 and thereby regulate the flow of resistance liquid and the shock absorbing capacity accordingly.

The particular construction of adjusting device shown in the present application as one embodiment of my invention co-operates with this valve stem 28 so that the latter may be turned manually at will from a point remote from the shock absorber so that the adjustment of the absorber can be effected while the automobile is in operation or running over a road.

The particular embodiment which is here shown as an example of one organization suitable for this purpose is constructed as follows:

The numeral 31 represents a bearing in which the front or outer end of the valve stem 28 turns and which is mounted on the operating arm of the shock absorber so as to be immovable relatively thereto, for which purpose this bearing 31 is mounted on the transverse inner arm 32 of a bracket and connected with the operating lever 18 by a longitudinal arm 33 arranged on the rear side of the inner arm 32 and secured to the adjacent hub of the operating lever or arm 18 of the shock absorber.

On the front end of the valve stem 28 is secured a driven pulley 34 which is preferably hollow or cup-shaped so as to enclose the bearing 31 and this pulley is provided on its peripheral face with two flanges 35 forming an annular groove between the same.

At a point remote from the shock absorber and within convenient reach of a person occupying the automobile, for example adjacent to the instrument board 37 which is in front of the driver's seat, is arranged a finger piece 38 which preferably has the form of a round handle, knob or wheel, as shown in Figs. 2 and 3, and which is adapted to be grasped by the fingers of a person for turning the same in order to regulate the shock absorbing effect of the absorber. This finger piece is mounted on the rear end of an operating shaft 39 which is journaled in a bearing sleeve 40 and provided at its rear end with a driving pulley 41.

Upon rotating the finger piece 38 and the driving pulley 41 motion is transmitted from the latter to the driven pulley 34 for the purpose of turning the valve stem and causing the valve 29 on the rear end of the latter to move toward or from its valve seat in the liquid by-pass of the absorber and thereby regulate the shock absorbing capacity of the instrument. This movement of the driving pulley is preferably transmited to the driven pulley by a cable, belt or line which preferably has two stretches 42, 42 extending from the driving to the driven pulley and having one of their corresponding ends wound in opposite directions around the driving pulley 41, and their corresponding opposite ends wound in opposite directions around the periphery of the driven pulley 34 between the flanges 35.

It follows from this construction that when the driving pulley 41 is turned in one direction by the finger piece 38 a pull will be exerted on one of the stretches 42 of the transmitting belt while the other stretch thereof will be relaxed and vice versa, whereby a rotary motion which is initiated by the finger piece 38 will be imparted to the valve stem 28 and thereby adjust the size of the by-pass for the resistance liquid from one end of each working chamber to the other.

The shifting or operating belt may be connected with the driving pulley 41 in various ways but preferably by passing a section 43 of this belt through a diametrical opening 44 in this pulley, as shown in Figs. 2 and 3 and thereby insuring a firm hold of the driving pulley on this belt so as to positively turn the valve stem 28 in one direction or the other. The opposite ends of these stretches of the operating belt may also be secured to the driven pulley in various ways, for example by passing the ends 36 transversely through openings 45 in these flanges, as shown in Figs. 1 and 2. These ends may be further secured to the peripheral part of the driven pulley by soldering the same thereto in case these belt stretches are made of metal cable, but if the same are made of other material any suitable means may be employed for fastening the same to the periphery of the driven pulley.

In actual installation the stretches of the adjusting belt may be deflected more or less from a straight line in order to pass around different parts of the automobile at different points between the driving pulley 41 and the driven pulley 34, and in order to permit these belt stretches to operate freely under these circumstances the stretches of the operating belt are guided by passing the same through flexible tubes 46 through which the stretches of the belt are free to slide lengthwise without interference with adjacent parts of the automobile.

In the preferred construction opposite ends of these flexible guide tubes are provided with sockets or nipples 47 and the nipples or sockets adjacent to the driven pulley 34 are screwed into an outer transverse arm 48 forming part of the bracket which supports the bearing 31 on the operating lever 18, while the nipples or sockets 47 on these flexible tubes adjacent to the driven pulley 41 are screwed into the lower end of a bracket 49 which is mounted on the bearing sleeve 40. In order to hold these sockets or nipples in place clamping screw nuts 50 are provided which have threaded engagement with these sockets and engage with the adjacent parts of the respective brackets for holding these parts in their proper position relative to each other.

The bearing sleeve 40 and the bracket 49 are rigidly secured to the instrument board 37 by engaging a head 51 on the front end of this bearing sleeve with the inner side of the instrument board 37 and pressing the bracket 49 against the outer side of this instrument board by means of a clamping nut 52 having threaded engagement with the periphery of the bearing sleeve 40 and engaging with the rear side of the bracket 49, as shown in Fig. 2. The operating shaft 39 is held against longitudinal movement in the bearing sleeve 40 by engagement of the finger piece 38 with the front end of this bearing sleeve, and a collar or flange 53 arranged on the shaft 39 and bearing against the rear end of the sleeve 40, as shown in Fig. 2.

It will now be obvious that upon changing the angularity of the driving pulley by means of the thumb piece 38 that this motion will be transmitted in one direction or the other to the driven pulley through the medium of the operating belt stretches for adjusting the resistance liquid by-pass of the shock absorber and thereby vary the shock absorbing capacity of the instrument accordingly.

By arranging the parts which are manipulated manually for this purpose adjacent to the driver's seat which is remote from the place where the shock absorber is installed, it is possible to effect such adjustment of the shock absorber conveniently at will and also while the automobile is in operation, thereby permitting of effecting a very close adjustment of the absorber to suit the particular load carried by the car under actual riding conditions, and to effect such adjustment easily and conveniently and as often as is necessary or desirable without stopping the car.

In order to permit such adjustment to be effected manually with ease the diameter of the driving pulley 41 is smaller than that of the driven pulley 34, the preferred relative diameter of these pulleys being in the proportion of about one of the driving pulley to three of the driven pulley. A reduction in the speed or amount of movement in the driven pulley as compared with the driving pulley is thus obtained and an increased leverage is obtained from the driving pulley to the driven pulley which permits the shock absorber to be adjusted manually with ease.

When the shock absorber shaft is turned by the arm 18 the bracket 48 and the bearing 31 rotate therewith and the cable loop around the pulley 34 will cause rotation of the pulley and valve at the same rate as the shaft so that the valve adjustment will not be disturbed. However, when the knob 38 is manually turned such movement is transmitted from the pulley 41 through the cable and to the pulley 34 and the valve is rotated relative to the shaft and the valve seat and adjustment of the fluid by-passageway is made.

If desired the motion may be transmitted from the driving pulley to the driven pulley by a single stretch of belting in which case the single belt is made of a stiff but flexible wire similar to that known as Bowden cable which is capable of transmitting motion in both directions by a push and pull action.

I claim as my invention:

1. Remote control mechanism for a hydraulic shock absorber in which a valve is adjustable by rotation thereof to control the flow of the resistance fluid, said control mechanism comprising a shaft provided at its rear end with a driving pulley and a forwardly facing shoulder, a bearing sleeve in which said shaft is journalled and which engages its rear end with said shoulder and provided at its front end with a head, a screw nut arranged on the rear end of said sleeve, a bracket receiving said sleeve and engaging the front side of said nut, said bracket and head being adapted to engage opposite sides of a support, a driven pulley adapted to be connected with the shock absorber valve, belts having their ends passing in opposite directions around said pulleys, a bracket adapted to be mounted on the shock absorber frame, and flexible guide tubes which are mounted on said brackets and which receive said belts.

2. Remote control mechanism for a hydraulic shock absorber in which a valve is adjustable by rotation thereof to control the flow of the resistance fluid, said control mechanism comprising a shaft provided at its rear end with a driving pulley and a forwardly facing shoulder, a bearing sleeve in which said shaft is journalled and which engages its rear end with said shoulder and provided at its front end with a head, a screw nut arranged on the rear end of said sleeve, a bracket receiving said sleeve and engaging the front side of said nut, said bracket and head being adapted to engage opposite sides of a support, a driven pulley adapted to be connected with the shock absorber valve, belts having their ends passing in opposite directions around said pulleys, a bracket adapted to be mounted on the shock absorber frame, means for guiding said belt consisting of flexible guide tubes which receive the belt and tubular sockets arranged at the ends of said tubes and engaging said brackets.

MAURICE HOUDAILLE.